(12) United States Patent
Sproch et al.

(10) Patent No.: US 6,247,134 B1
(45) Date of Patent: Jun. 12, 2001

(54) METHOD AND SYSTEM FOR PIPE STAGE GATING WITHIN AN OPERATING PIPELINED CIRCUIT FOR POWER SAVINGS

(75) Inventors: James D. Sproch, Saratoga, CA (US); Michael Münch, Bonn (DE); Renu Mehra, Santa Clara, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 09/283,128

(22) Filed: Mar. 31, 1999

(51) Int. Cl.$^7$ ........................................... G06F 1/32
(52) U.S. Cl. ................ 713/320; 395/500.23; 395/500.39
(58) Field of Search ........................ 713/300, 320, 713/321; 395/500.02, 500.03, 500.07, 500.05, 500.39

(56) References Cited

U.S. PATENT DOCUMENTS

| | | | |
|---|---|---|---|
| 5,448,497 | * 9/1995 | Ashar et al. | 364/489 |
| 5,530,841 | 6/1996 | Gregory et al. | 395/500 |
| 5,673,200 | 9/1997 | Toyonaga et al. | 364/490 |
| 5,825,646 | 10/1998 | Keeler et al. | 364/164 |
| 5,847,981 | * 12/1998 | Kelly et al. | 364/750.5 |
| 5,903,466 | 5/1999 | Beausang et al. | 364/488 |
| 6,038,381 | * 3/2000 | Munch et al. | 395/500.02 |
| 6,105,139 | * 8/2000 | Dey et al. | 713/300 |

FOREIGN PATENT DOCUMENTS

411073449 * 3/1999 (JP) ............................. G06F/17/50

OTHER PUBLICATIONS

Overview Of The Power Minimization Techniques employed In The IBM PowerPC 4XX Embedded Controllers, Anthony Correale, Jr., PowerPC Integrated Solutions IBM Microelectronics, RTP, NC, International Symposium on Low Power Design, Dana Point, CA, Aug. 1995.

"Guarded Evaluation: Pushing Power Management To Logic Synthesis/Design" Tiwari et al., International Symposium on Low Power Design, Dana Point, CA, Apr. 1995.

* cited by examiner

Primary Examiner—Xuan M. Thai
(74) Attorney, Agent, or Firm—Wagner, Murabito & Hao LLP

(57) ABSTRACT

A method and system for power savings within a pipelined design by performing intelligent stage gating. The present invention recognizes that not every operand applied to the input of a pipeline requires a recomputation in the different pipeline stages. Circuitry is used to generate a signal, C, indicating that this condition holds. C is then used to gate the register bank at the input of the first pipeline stage thereby potentially saving power in the register bank. Moreover, C can also be stored in a register, the output of which: a) gates the register bank of the second stage; and b) connects to another register to store signal C to be used in the third stage. Power savings is provided by not clocking the register circuit of the stage, and in some instances, power is saved within the stage's associated combinational logic. In one embodiment, a register (to store C) is added in each stage of a pipeline to use C as a gating signal in the subsequent stage. This yields a structure in which signal C propagates through the pipeline in synchronization with the clock, successively gating the associated register banks. The value of C is generated whenever the output of the stage is inconsequential. For example, the output can be inconsequential in cases when duplicate operands are received in back-to-back clock cycles. Also, in maximum and minimum cases a operand that is not larger or smaller, respectively, than the largest or smallest previously received operand can yield an inconsequential result.

28 Claims, 11 Drawing Sheets

60

METHOD AND SYSTEM FOR PIPE STAGE GATING WITHIN AN OPERATING PIPELINED CIRCUIT FOR POWER SAVINGS

BACKGROUND OF THE INVENTION

1. Field of the Invention

The present invention relates to the field of electronic design automation (EDA). More specifically, the present invention relates to the field of techniques for reducing power consumption within integrated circuits that can be designed using a computer controlled EDA system.

2. Related Art

Electronic design automation (EDA) systems are a form of computer aided design (CAD) systems and are used for designing integrated circuit (IC) devices. The EDA system typically receives one or more high level behavioral descriptions of an IC device (e.g., in hardware description language such as VHDL or Verilog) and translates this high level design language description into netlists of various levels of abstraction. At a higher level of abstraction, a generic netlist is typically produced that can be translated into a lower level technology-specific netlist based on a technology-specific library. A netlist describes the IC design and is composed of nodes (elements) and edges, e.g., connections between nodes, and can be represented using a directed cyclic graph structure having nodes which are connected to each other with signal lines. A single node can have multiple fan-ins and multiple fan-outs. The netlist is typically stored in computer readable media within the EDA system and processed and verified using many well known techniques. One result is a physical device layout in mask form which can be used to directly implement structures in silicon to realize the physical IC device.

Often, during the many optimizations and refinements of the netlist design, the power consumed by the netlist design becomes an important consideration for an IC designer. The IC designers desire to reduce the power consumed by various netlist designs in order to satisfy frequently specified low power consumption constraints for their circuits. Low power consumption constraints can be relevant for a number of different applications. For example, the resulting IC device might be used in a portable device having limited battery life, or, the IC device might be integrated within a system in which heat dissipation is a critical factor, etc. The supply of IC devices for portable (e.g., battery powered) components is a large and growing market segment including hand-held communication and computing devices as well as portable computer systems. For a number of commercially important reasons, not the least of which is routine energy conservation, designers want to reduce the power consumed and dissipated by their IC devices.

One technique for power consumption reduction is called operand isolation, an example of which is shown in circuit 10 of FIG. 1A. One implementation of this technique is described by A. Correale, Jr., in a paper entitled, "Overview of the Power Minimization Techniques Employed in the IBM PowerPC 4xx Embedded Controllers," published in 1995 by the International Symposium on Low Power Design (ISLPD) at Dana Point, Calif. The concept within operand isolation is to isolate the input operand signals of a functional unit during those clock cycles when the output of the functional unit is not propagated through the netlist (e.g., it is not used by the netlist and does not alter the primary outputs of the IC device).

Circuit 10 of FIG. 1A includes four functional units 12, 14, 16 and 18 implemented in circuitry. The input operand signals originate from an operand bus 30. These circuits 12, 14, 16 and 18 consume power when their inputs transition, whether or not their outputs are used. Without operand isolation, the circuits 12, 14, 16 and 18 concurrently execute each clock cycle and a single output is selected among them by multiplexer 20 and propagated. Power is needlessly wasted because only one functional unit's output is propagated by multiplexer 20 per clock cycle.

However, with operand isolation as shown in FIG. 1A, each operand signal must pass through an operand latch circuit 40a, 40b, 40c and 40d which only allows passage when its corresponding functional unit's output is selected by the multiplexer 20. Operand signals only pass through circuit 40a when signal t1 is active (c1 is #t1); operand signals only pass through circuit 40b when signal t2 is active (c2 is #t2); operand signals only pass through circuit 40c when signal t3 is active (c3 is #t3); and operand signals only pass through circuit 40d when signal t4 is active (c4 is #t4). Signals t1 through t4 originate from the select inputs of multiplexer 20 which selects only one of the outputs from circuits 12, 14, 16 and 18 for any given clock cycle. Signals t1 through t4 are used by circuits 40a–40d to isolate the operands of three of the functional unit circuits for each clock cycle and allow only one functional unit circuit to operate. By isolating the operand inputs as described above, the functional unit circuits that produce unneeded results are disabled and do not needlessly consume power.

The problem with circuit 10 is that the signals t1–t4, which control the operand isolation circuits 40a–40d, originate from existing circuitry of the underlying circuit. In most cases, designers cannot rely on isolation signals originating from existing circuitry of the underlying circuit. For instance, these signals t1–t4 exist whether or not operand isolation is applied to the functional units 12, 14, 16, 18. In many cases, there may not be a suitable signal (to use for operand isolation) existing within the underlying circuit, or, the signals existing within the underlying circuit may not give the isolation coverage desired by an IC designer. In effect, the signals available to control isolation circuits may isolate the operands of a functional unit circuit only during a small subset of the instances where the function's output is ignored. In this case, only a fraction of the total possible power savings is achieved.

Another prior art method of operand isolation is described in a paper entitled, "Guarded Evaluation: Pushing Power Management to Logical Synthesis/Design," published in 1995 by the ISLPD at Dana Point, Calif. by V. Tiwari. Tiwari describes a circuit having transparent latches that make up guard logic to perform operand isolation. The latches control the passage of input operand signals to arithmetic functional units (e.g., shifters, adders, etc.) In a pass mode, the latch allows the operand signals to pass through and in a non-pass mode the latch holds its previous value to prevent new operand signals from reaching the arithmetic functional unit. The guard logic is controlled by a signal, s, which is based on the observability of the output of the arithmetic functional unit. Like Correale, Tiwari uses an existing signal from the underlying circuit to achieve the signal, s. Specifically, Tiwari uses ATPG (Automatic Test Pattern Generation) tools to find the existing signal to couple as signal s.

Because Tiwari is limited by controlling the guard logic with an underlying signal that already exists within the netlist, Tiwari is limited in two ways. First, the duty cycle or duration of operand isolation coverage available for each node is limited and, second, Tiwari is limited in the number of nodes to which his operand isolation can be applied at all.

For instance, FIG. 1B illustrates a set 64 of all conditions under which an arithmetic functional unit generates an output that is not needed (e.g., an observability don't care condition). By using only a signal that exists within the netlist to generate signal s, Tiwari is limited to only a subset 62 of set 64 where subset 62 represents power savings achieved and set 64 represents total possible power savings. In this manner, operand isolation coverage of set 62 is limited. Further, using the concepts of ATPG and observability may not even result in an existing signal that can be used for isolation coverage with respect to particular nodes. In this case, under Tiwari, operand isolation would not even be applied to these particular nodes because there exists no signal to control the isolation logic. Therefore, no power savings is achieved for these nodes.

As described above, power optimizations previously presented in literature have mostly targeted smaller parts of a design, such as localized combinational logic or a set of sequential elements. Very few transformations have been applied to entire design entities such as finite state machines (FSMs) or pipelined data paths as a whole, contrary to the generally accepted belief that optimizations on higher level of abstractions will yield the highest power savings.

In particular, pipelined designs have been considered unattractive candidates for clock gating and operand isolation techniques for power savings because the registers between pipeline stages are enabled in each cock cycle and therefore do not present clock gating/isolation opportunities. In the past, clock gating for power savings has been applied to pipelined designs only by enabling or disabling the entire pipelined design. For instance, in a transmitter/receiver circuit device, when the device is receiving, all of its transmitting data path circuits can be clock gated for power savings. Likewise, when the device is receiving, all of its transmitting data path circuits can be clock gated. This form of pipelined design clock gating totally shuts down the pipeline circuit in order to save power therein. Heretofore, clock gating has not been applied to an operating pipelined design. What is needed is a better power savings approach that is applicable to operating pipelined designs.

Accordingly, what is needed is a mechanism and method for applying power savings technique to a pipelined design that does not require the pipelined design to be totally shut down during the power savings mode. In effect, what is needed is a power savings technique that can be applied to the stages of a pipelined design while simultaneously allowing the pipelined design to operate and process data path information. The present invention provides these advantageous functionalities. These and other advantages of the present invention not specifically mentioned above will become clear within discussions of the present invention presented herein.

SUMMARY OF THE INVENTION

A method and system for power savings within an operating pipelined design ("pipeline," "data path") by performing intelligent pipe stage gating. The present invention recognizes that not every operand applied to the input of a pipeline requires a recomputation in the different pipeline stages ("pipe stages"). That is, the pipeline circuit may not care about some of the input data even though this data would conventionally propagate through the pipeline stages of the data path. In accordance with the present invention, stall signal generation circuitry is used to generate a stall signal, C, indicating that data is received that the pipeline does not care about, e.g., its results are inconsequential. The signal, C, is then used to gate the register bank at the input of the first pipeline stage thereby potentially saving power in the register bank.

Moreover, in accordance with the present invention, C can also be stored in a clocked register, the output of which: (1) gates the register bank of the second stage; and (2) connects to another register to store signal C to be used in the third stage. In this embodiment, a register that is used to store C is added in each stage of the pipelined design to use C as a gating signal in the subsequent stage. This yields a structure in which signal C propagates through the pipeline in synchronization with the clock, successively gating the associated register banks. In this fashion, the stall signal, C, is able to propagate down the stages of the pipeline in synchronization with its associated "don't care" data. Power savings is provided by not clocking the register circuit of the stage, and in some instances, power is saved by gating the stage's associated combinational logic.

The value of C is generated for data whenever the output of the stage is inconsequential. The output is inconsequential in cases when: (1) there is no need to store the data; and/or (2) the result is duplicate from the previous clock cycle. For example, in the case when the input operand does not change, the results in the pipe stages processing this input operand need not be recomputed. The output can be inconsequential in cases when duplicate operands are received in back-to-back clock cycles. This condition is detected using a comparator circuit at the pipeline input to compare two successive input operands. The signal C is the output of the comparator circuit. Also, in maximum and minimum cases, the operand may be different, but still yield inconsequential results that need not be stored. For example, in one embodiment, assume a maximum operation of max(a, b), where a(t) (a at time t) >=b(t), e.g., max(a(t), b(t))=a(t). In the case where a(t+1)=a(t) and b(t+1)<b(t), the output of the max operator remains unchanged. Generally, this condition can be detected using a comparator at the output of the first pipeline stage.

In a general scenario, an external supervisor may produce the stall signal, C. Rather than shutting down the entire pipeline circuit, the supervisor uses information about the redundancy of the applied input operands to indicate that the result of a particular input operand is not relevant. This allows application of the present invention to pipelined processors. By viewing the control part of the processor pipeline as a separate design entity from the data portion, control signals produced by the former can be used as stall signals in the latter. In the latter two cases, additional saving can be achieved by "isolating" the combinational block in the first stage to prevent the propagation of input activity through this stage. This "isolation" can be achieved using latches, or gates (AND/OR) to pull the input signals of the combinational circuitry to a predefined value.

Specifically, an embodiment of the present invention includes a method for reducing power within an electronic integrated circuit, the method comprising the steps of: a) at a clock cycle, receiving an operand signal at a circuit stage of a pipelined circuit; b) determining that the result of the operand signal is inconsequential to the pipelined circuit; c) responsive to the step b), generating a stall signal associated with the operand signal that clock gates the circuit stage of the pipelined circuit during the clock cycle; and d) clock gating successive downstream circuit stages of the pipelined circuit for power savings by propagating the stall signal through a clocked register circuit in synchronization with subsequent clock cycles. Embodiments include the above method and wherein the step b) further comprises the step of determining that the result of the operand signal is inconsequential to the pipeline circuit by determining that the operand signal and the prior operand signal are equal.

An embodiment of the present invention also includes a circuit comprising: a pipeline circuit having an input port and an output port, the pipeline circuit comprising n serially coupled pipeline stages wherein each pipeline stage is clocked by a clock signal and comprises a clocked register coupled to a combinational logic circuit; stall determination logic coupled to the input port and coupled to an output of a clocked register of a first pipeline stage of the pipeline circuit, the stall determination logic for determining when results of a first operand signal received at the input port are inconsequential to the pipeline circuit and for generating a stall signal in response thereto; and a signal propagation circuit for propagating the stall signal to the second through nth pipeline stages of the pipeline circuit in lock-step with the associated data signal wherein the stall signal is for clock gating respective pipeline stages of the pipeline circuit for power savings.

Embodiments include the above circuit and further comprising clock gating circuitry coupled to the signal propagation circuit and coupled to the pipeline circuit, the clock gating circuitry for clock gating a respective pipeline stage of the pipeline circuit based on the stall signal of the signal propagation circuit and wherein the output of the clocked register of the first pipeline stage is for holding a second operand signal and wherein the stall determination logic is a comparator for generating the stall signal in response to the first operand signal being equal to the second operand signal.

DETAILED DESCRIPTION OF THE INVENTION

Figure 1A:
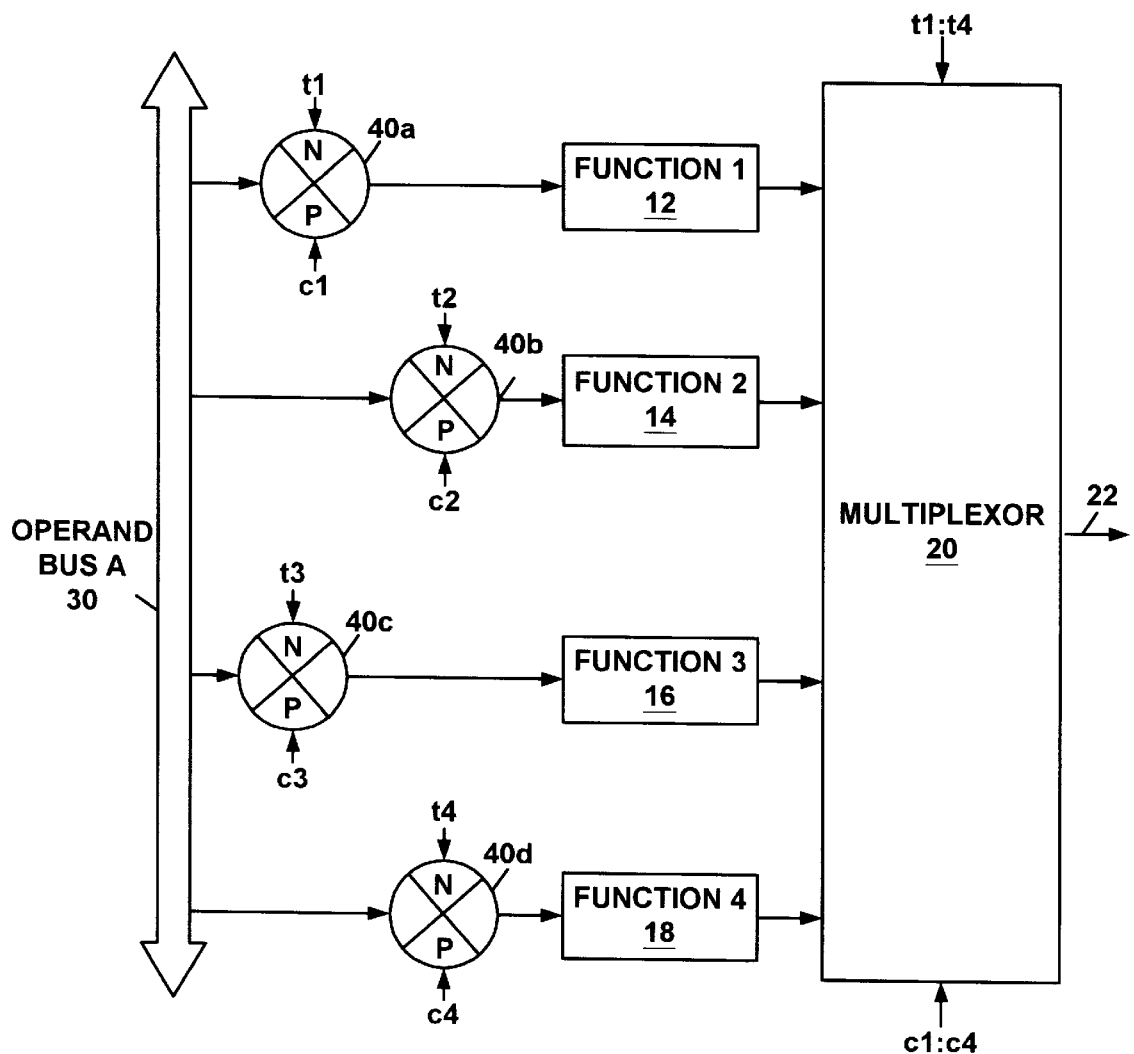
FIG. 1A illustrates a prior art circuit for performing operand isolation within an integrated circuit design.
Figure 1B:
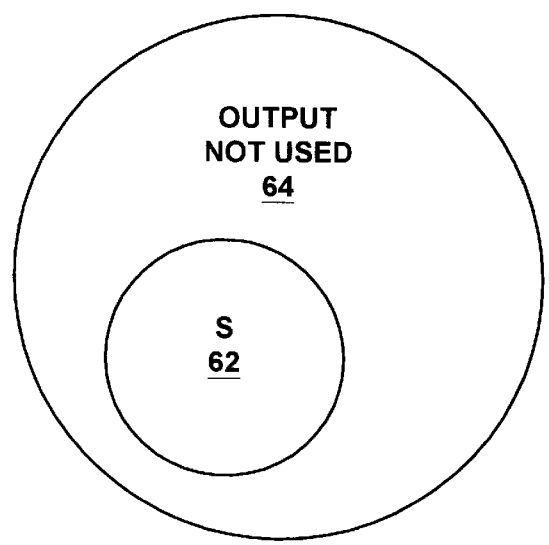
FIG. 1B illustrates a prior art signal, s, available from the underlying design and used to indicate a subset of the set of states when the output of a particular circuit function is not used, e.g., don't care states.

In the following detailed description of the present invention, a power savings method and circuit for pipeline stage gating of a pipelined circuit design for operands having inconsequential results, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system (e.g., FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM PLATFORM 112

The present invention power savings method and circuit can be applied to a pipeline circuit, e.g., a data path circuit, for reducing power dissipation within the pipeline circuit. Power dissipation is reduced, in accordance with the present invention by clock gating pipe stages of the pipeline circuit for input operands whose results are inconsequential to the pipeline computation. To this extent, the present invention utilizes circuitry that is added to a pipeline circuit and this circuitry can be added and/or designed and/or simulated using a computer aided design (CAD) tool in an electronic design automation (EDA) system. As discussed above, EDA systems are a form of computer aided design (CAD) systems and are used for designing and simulating integrated circuit (IC) devices.

In the EDA tool, the circuitry is represented as circuit models or circuit descriptions and are stored in computer memory and these circuit models represent physical integrated circuit devices. Therefore, all circuits described herein can be understood to be physical circuits devices and also can be understood to be circuit models that are stored in computer memory. The circuit models can be simulated in the CAD tool. Within such a system, the CAD tool is a general purpose computer system having specialized EDA software installed. Although the pipeline architecture of the present invention can be designed and/or simulated using a number of different circuit design methodologies, an exemplary general purpose computer system 112 is shown in FIG. 2.

In general, computer system 112 includes an address/data bus 100 for communicating information, a central processor 101 coupled with the bus for processing information and instructions, a volatile memory 102 (e.g., random-access memory RAM) coupled with the bus 100 for storing information (e.g., circuit models) and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user. Data storage device 104 can include one or more removable magnetic or optical storage medias (e.g., diskettes, tapes) which are computer readable memories.

Figure 2:
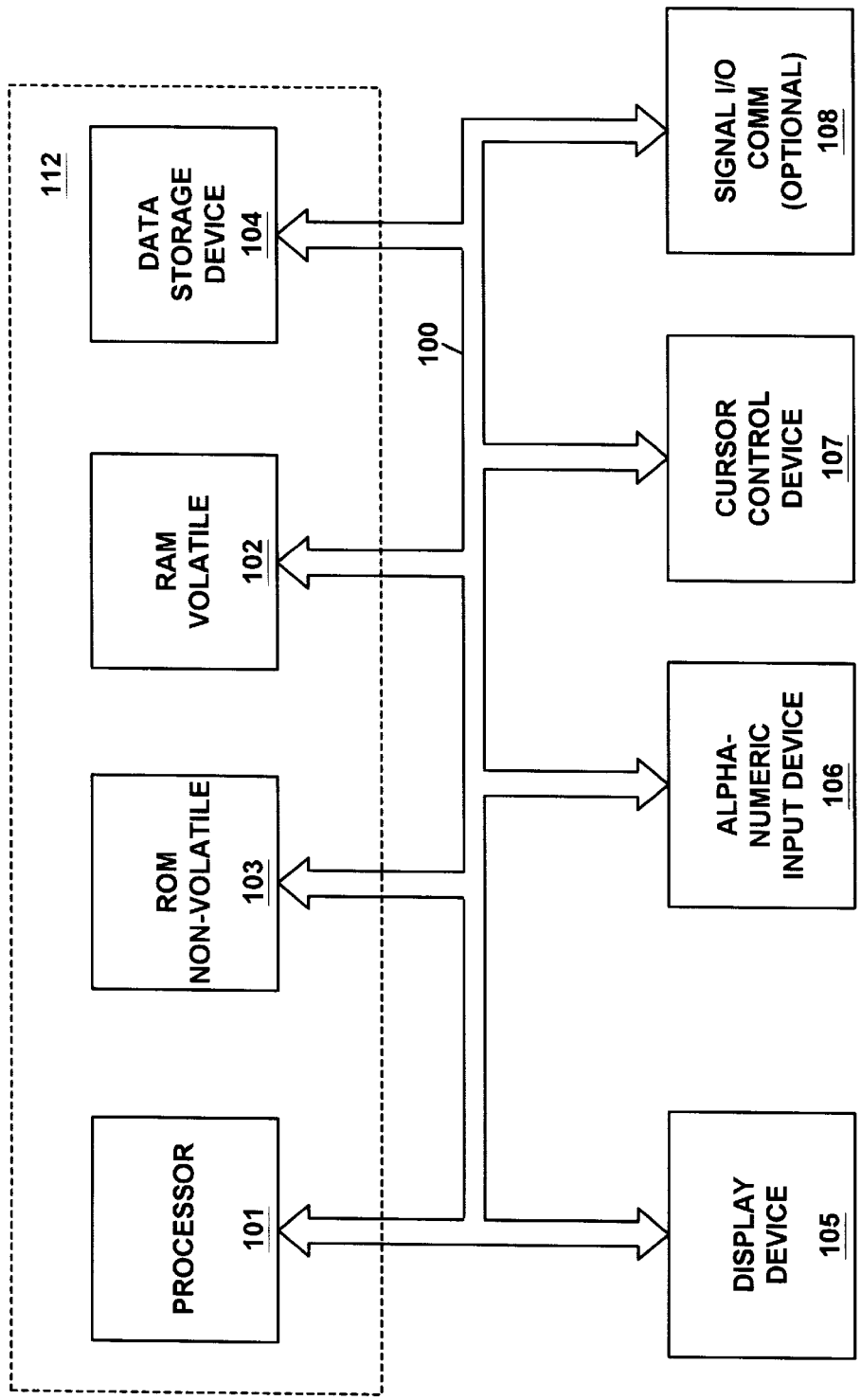
FIG. 2 is a general purpose computer system on which a computer aided design (CAD) system can be implemented.

Also included in computer system 112 of FIG. 2 is an alphanumeric input device 106 including alphanumeric and function keys coupled to the bus 100 for communicating information and command selections to the central processor 101. System 112 also includes a cursor control or directing device 107 coupled to the bus for communicating user input information and command selections to the central processor 101. Computer system 112 can also include an optional signal generating device 108 coupled to the bus 100 for interfacing with other networked computer systems. The display device 105 utilized with the computer system 112 of the present invention may be a liquid crystal device, other flat panel display, cathode ray tube, or other display device suitable for creating graphic images and alphanumeric characters recognizable to the user.

PIPE STAGE GATING OF THE PRESENT INVENTION

Figure 3:
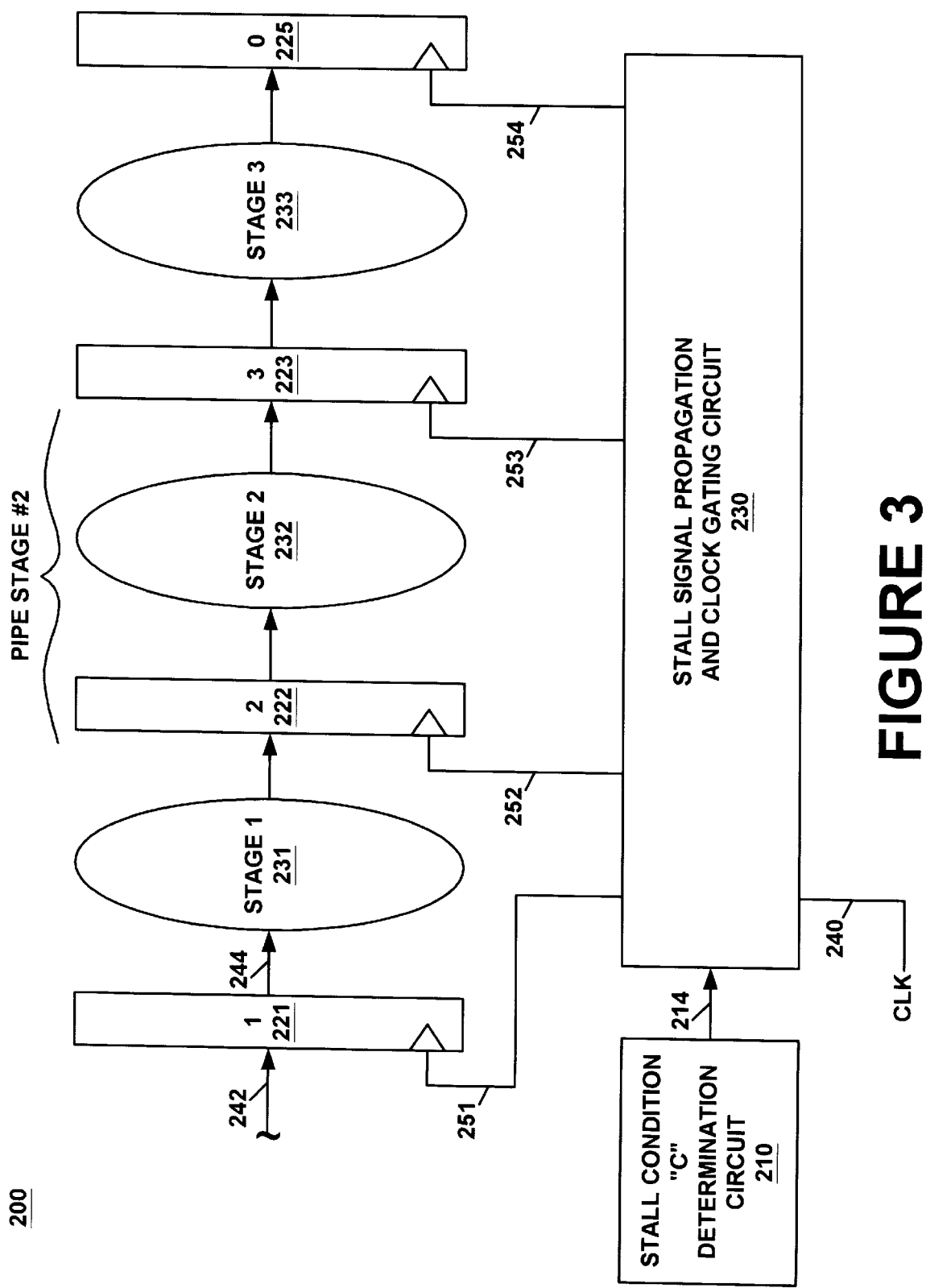
FIG. 3 is a logical block diagram of the power savings architecture of the present invention applied to a pipelined "data path" circuit.

FIG. 3 illustrates a circuit 200 in accordance with one embodiment of the present invention. Circuit 200 includes a pipeline circuit having n number of serially coupled pipe stages with each pipe stage having a clocked register that is coupled to combinational logic. For instance, the first stage of the pipeline circuit includes clocked register 221 coupled to combinational logic circuit 231. The second stage of the pipeline circuit includes clocked register 222 coupled to combinational logic circuit 232. The third stage of the pipeline circuit includes clocked register 223 coupled to combinational logic circuit 233. The output of the pipeline circuit is then taken from clocked register 225. In this exemplary case, there are three stages, e.g., n=3, however, the number of stages is exemplary only and larger number or fewer number of stages can be used in accordance with the present invention.

Pipe stages as shown in FIG. 3 are typically used as data paths for performing high speed computations on streaming data, e.g., video data, audio data, voice data or data used within a microprocessor or microcontroller, etc. The power savings techniques of the present invention are particularly useful when processing information of a data stream where data stability is expected. In these cases, the data coming over the data stream carries many back-to-back duplicate values. For instance, when processing a video image, many portions of the image can be uniform in color, e.g., in backgrounds or for solid image portions, etc. In these cases, the same color data is presented to the data path circuit in back-to-back clock cycles. In other applications, there are expected periods of silence when processing voice and/or sound information during a two-way communications. In these cases, duplicate null or otherwise duplicate or "don't care" data arrive at the data path circuit in back-to-back clock cycles There are other examples where a data path circuit confronts duplicate and/or "don't care" data. For instance, some devices, such as pagers or cell phones, spend much of their time doing no activity at all. In other applications, such as an address generation unit, the most significant byte (MSB) address generation circuit will generate the same MSB value over several clock cycles, e.g., in accessing a contiguous block of data. In streaming data, whenever the data is stable, the present invention acts to clock gate certain stages of a data path pipeline circuit to save power therein. The clock gating is performed such that successive pipe stages of the pipeline are clock gated in synchronization with the inconsequential data.

The streaming data appear over multi-bit input bus 242 of FIG. 3 as multi-bit operand signals (also called "operands") that are latched into the first clocked register 221 of the first pipe stage circuit. In the exemplary circuit 200 of FIG. 3, input operand signals are received over bus 242. The clocked registers 221–223 of the pipe stages of a typical pipeline circuit are clocked by a common system clock signal over line 240 thereby moving data in "lock-step"from the left to the right, e.g., "downstream," in synchronization with the clock signal. On each clock cycle, the output of each combinational logic circuit 231–233 is latched and held by the clocked register of the next downstream pipe stage. Result data is then obtained at the output port of clocked register 225.

The present invention adds circuitry 230 and circuitry 210 to perform pipe stage clock gating at certain pipe stages of the pipeline circuit under certain conditions for power savings. In general, the present invention identifies certain incoming data whose results are inconsequential (e.g., "don't care" or "duplicate") to the pipeline. The present invention then generates a clock gating signal ("stall signal") for that data and propagates that stall signal successively through each downstream pipe stage in synchronization with the clock signal. In this fashion, the stall signal, C, is propagated through the stages of the pipeline along with its associated inconsequential results.

In other words, if it is determined that an input operand is inconsequential to the result of the pipeline circuit, then each pipe stage that encounters this result data can be clock gated thereby reducing power dissipation within the pipeline circuit. Power is dissipated within a clocked register typically upon clock transitions of clock signal 240. In some semiconductor architectures, power is also dissipated by combinational logic during the clock transition. Therefore, by clock gating the clocked register (and the combinational logic circuitry) of a pipe stage, power consumption within the pipeline circuit can be reduced in accordance with the present invention.

Circuit 210 of FIG. 3 is used to determine which input operands satisfy the power savings condition, also called the stall condition, C, which leads to pipe stage gating in accordance with the present invention. Circuit 230 is then used to propagate this stall signal, C, through to each other pipe stage of the pipeline circuit 200 in synchronization with the movement of the data/results that are associated with the operand. A number of different techniques can be used by circuit 210 to signal when the stall condition, C, is to be generated; including a technique in which the stall signal condition, C, is actually supplied to circuit 210 externally. In one exemplary implementation, the input operand signal (on bus 242) associated with the current clock cycle, e.g., the "input operand," is supplied to stall condition determination circuit 210 ("circuit 210"). In this exemplary implementation, the operand signal (on bus 244) associated with the last clock cycle, e.g., the "prior operand," is obtained from the output of clocked register 221 and supplied to stall condition determination circuit 210 ("circuit 210").

Using the input operand and the prior operand, circuit 210 determines whether or not the results of the input operand are inconsequential to the result of the pipeline circuit. There are a number of different techniques that circuit 210 can utilize to determine whether or not the results are inconsequential. These techniques are discussed further below. However, if the above case is found to exist, then circuit 210 generates a stall signal, C, over line 214. The stall signal, C, is associated with the input operand received over bus 242 and is communicated to the stall signal propagation circuit 230 ("circuit 230").

Circuit 230 of FIG. 3 is clocked by clock signal 240 and asserts the stall signal, C, to clock gate clock signal line 251 which clock gates clocked register 221 of the first pipe stage circuit because the result of the computation was determined by circuit 210 to be inconsequential. Circuit 230 then acts to propagate the stall signal, C, through each of the other stages of the pipeline circuit in synchronization with the clock cycle. This acts to keep quiescent the inconsequential data in lock-step with the other data of the pipeline. Each stage that is clock gated is potentially saving power. For instance, on the next clock cycle, circuit 230 clock gates the clock signal over line 252 to clock gate the second pipe stage circuit (including clocked register 222). On the third clock cycle, circuit 230 clock gates the clock signal line 253 to clock gate the third pipe stage circuit (including clocked register 223), and so forth, through all the pipe stages of the pipeline circuit. In this case, the stall condition signal, C, "bubbles" through each pipe stage of the pipeline successively gating the associated register.

Power is saved within the pipeline circuit of the present invention by not clocking the clocked registers when they encounter the inconsequential results. This acts to ignore the results and the registers maintain their current value. The registers typically dissipate most of their power when their circuits change, e.g., when they clock in new data. Therefore, by clock gating, power dissipation is reduced in the clocked registers of the pipe stage circuits. Additionally, some semiconductor architectures dissipate energy in the combinational logic when clocked (e.g., domino logic). In these technologies, the combinational logic associated with the pipe stage can also be clock gated in synchronization with the clocked register thereby increasing the power savings.

It is appreciated that the present invention can also be applied in the case of a pipeline circuit where a combinational stage is the first stage in the circuit (e.g., there is no first register). In this case, the present invention acts to (1) operand isolate the first stage and (2) pipeline stall the remainder stages.

Figure 4:
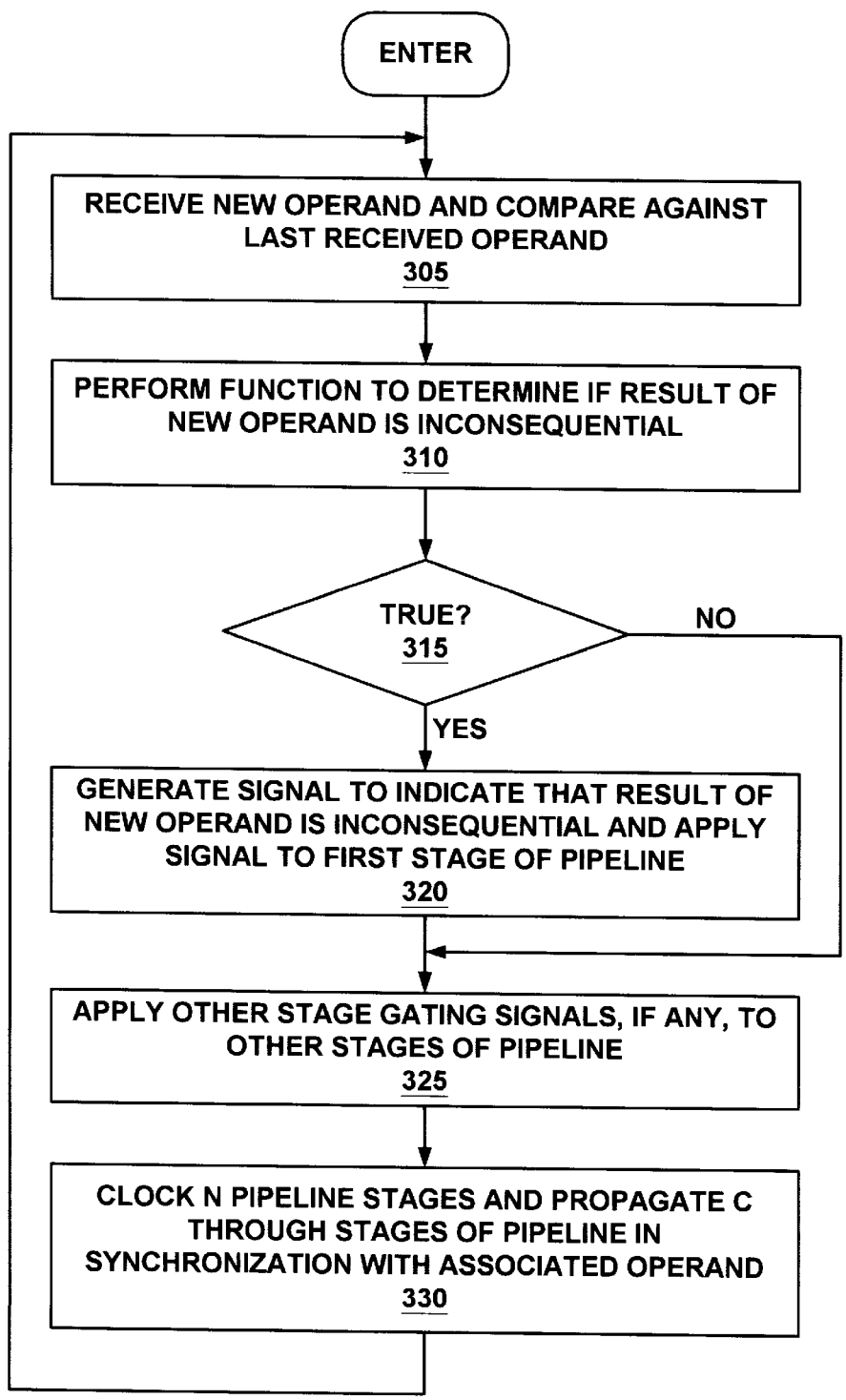
FIG. 4 is a flow chart illustrating steps of the power saving method of the present invention as applied to a pipelined data path circuit.

FIG. 4 illustrates a flow diagram of steps of the power savings process 300 employed in circuitry by the present invention. FIG. 4 describes the process 300 performed by the circuit 200. One or more of the described steps can be performed simultaneously as circuit 200 operates on data concurrently. At step 305, the first pipe stage (e.g., stage 1) of the pipeline circuit 200 receives a new multi-bit operand signal. In one embodiment, this received operand signal is compared against the previous multi-bit operand signal received by the pipeline circuit 200. At step 310, the value of C is computed. In one embodiment, the present invention performs a function based on the two operands to determine if the new operand generates results that are inconsequential to the pipeline circuit 200. The output is inconsequential in cases when: (1) there is no need to store the data; and/or (2) the result is duplicate from the previous clock cycle. For example, in the case when the input operand does not change, the results in the pipeline stages processing this input operand need not be recomputed. In one embodiment, this condition can be detected using a comparator circuit at the pipeline input to compare two successive input operands. In one embodiment of the present invention, if the two operand signals are equal, then the results of the new operand are inconsequential because they will be equal to the results of the previous operand.

Alternatively, at step 310, although the input operand is different from the previous operand, it may nevertheless fail to affect the results in the subsequent stages of the pipeline circuit and therefore it does not need to be stored. With respect to maximum and minimum computations, only the maximum or the minimum operand need be computed. In these cases, if the new operand is less than the previous operand, then the results of the new operand can be ignored. Or, if the new operand is greater than the previous operand, then the results of the new operand can be ignored. An example follows. Assume a maximum operation called max(a, b) where a(t)>=b(t), e.g., max(a(t), b(t))=a(t) where a(t) is a at time t. In the case where a(t+1)=a(t) and b(t+1)<b(t), the output of the max operator remains unchanged. In one embodiment, this condition may be detected using a comparator positioned between the inputs and outputs of the first register.

At step 315 of FIG. 4, if the new operand leads to inconsequential results, then step 320 is entered, otherwise step 325 is processed. At step 320, the present invention generates a stall signal, C, associated with the new operand signal. This stall signal is applied to clock gate the clocked register of the first stage of the pipeline circuit. Essentially, this acts to disable the clocking of the first stage of the pipeline circuit for the present clock cycle. With the clock disabled, the first stage of the pipeline circuit maintains the same data as in the prior clock cycle. At step 325, circuit 230 applies other clock gating signals that are already maintained in the propagation circuit 230, if any, to other pipe stages of the pipeline circuit.

At step 330, the present invention clocks the pipe stages of circuit 200 and propagates the stall signal, C, through circuit 230. In this fashion, the stall signal, C, is allowed to propagate through the second to n pipe stages of the pipeline circuit of the present invention in synchronization with the clock signal and in synchronization with the results of the new operand. Processing then flows to step 305 for a next operand signal.

Figure 5:
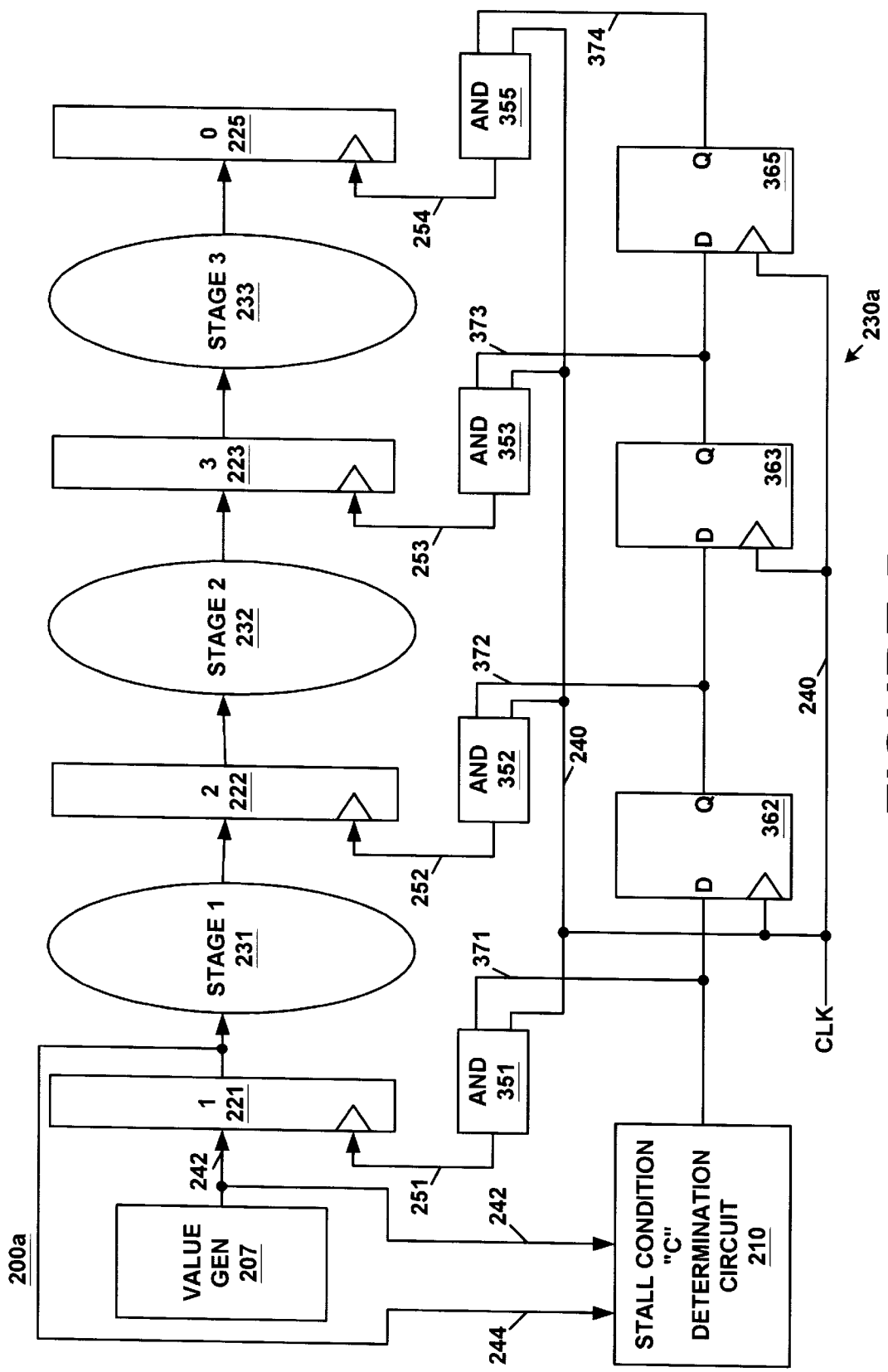
FIG. 5 is a circuit diagram illustrating one embodiment of the present invention employing serially coupled shift registers for stage gating of a pipelined design.

FIG. 5 illustrates an embodiment of the present invention 200a which utilizes serially coupled sequential elements (e.g., D-flip flops) as the propagation circuit 230a and also couples buses 244 and 242 to circuit 210. In this example, a shift register is used as the stall signal propagation circuit 230a. The input operand is generated by a value generation circuit 207 (which could be any circuit and/or register) and supplied over bus 242. Circuit 230a contains a respective D-flip flop circuit for each respective pipe stage of the second through nth pipe stages. For a pipeline of n stages, there are (n–1) such sequential elements. For example, register 362 is associated with the second pipe stage register 222 and register 363 is associated with the third pipe stage register 223. In this example, the pipeline circuit 200a has three pipe stages (n=3) and an output register 225. Cells 362–365 are all clocked by line 240 as shown. The output of stall condition determination circuit 210 is fed into the D input of clocked memory cell 362. The Q output of cell 362 is fed into the input of clocked memory cell 363. The Q output of cell 363 is fed into the input of clocked memory cell 365. Cells 362–365 form a serial shift register which acts to propagate the stall signal, C, through each stage of the second through nth stages of the pipeline circuit in synchronization with the clock signal of line 240.

Each pipe stage of the n pipe stages of circuit 200a of FIG. 5 has gating circuitry which is used to clock gate its respective clocked register. In this example, the gating circuitry used are AND gates and the stall signal, C, is asserted low. For instance, AND gate 351 controls the clock input of clocked register 221 of the first pipe stage. AND gate 351 receives as inputs the clock signal over line 240 and an enable control line 371 which is output from circuit 210. AND gate 352 controls the clock input of clocked register 222 of the second pipe stage. AND gate 352 receives as inputs the clock signal over line 240 and an enable control line 372 which is output from circuit 362. AND gate 353 controls the clock input of clocked register 223 of the third pipe stage. AND gate 353 receives as inputs the clock signal over line 240 and an enable control line 373 which is output from circuit 363. Lastly, AND gate 355 controls the clock input of clocked register 225 that is the output port. AND gate 355 receives as inputs the clock signal over line 240 and an enable control line 374 which is output from circuit 365.

In the example of FIG. 5, the new operand signal over bus 242 is compared against the prior operand signal over bus 244 to determine whether or not the stall condition, C, is present for the new operand signal. As an example, if the operands are equal, then circuit 210 generates the stall signal, C. Alternatively, maximum or minimum conditions (or any other suitable function) may be used to generate the stall signal, C.

Figure 6:
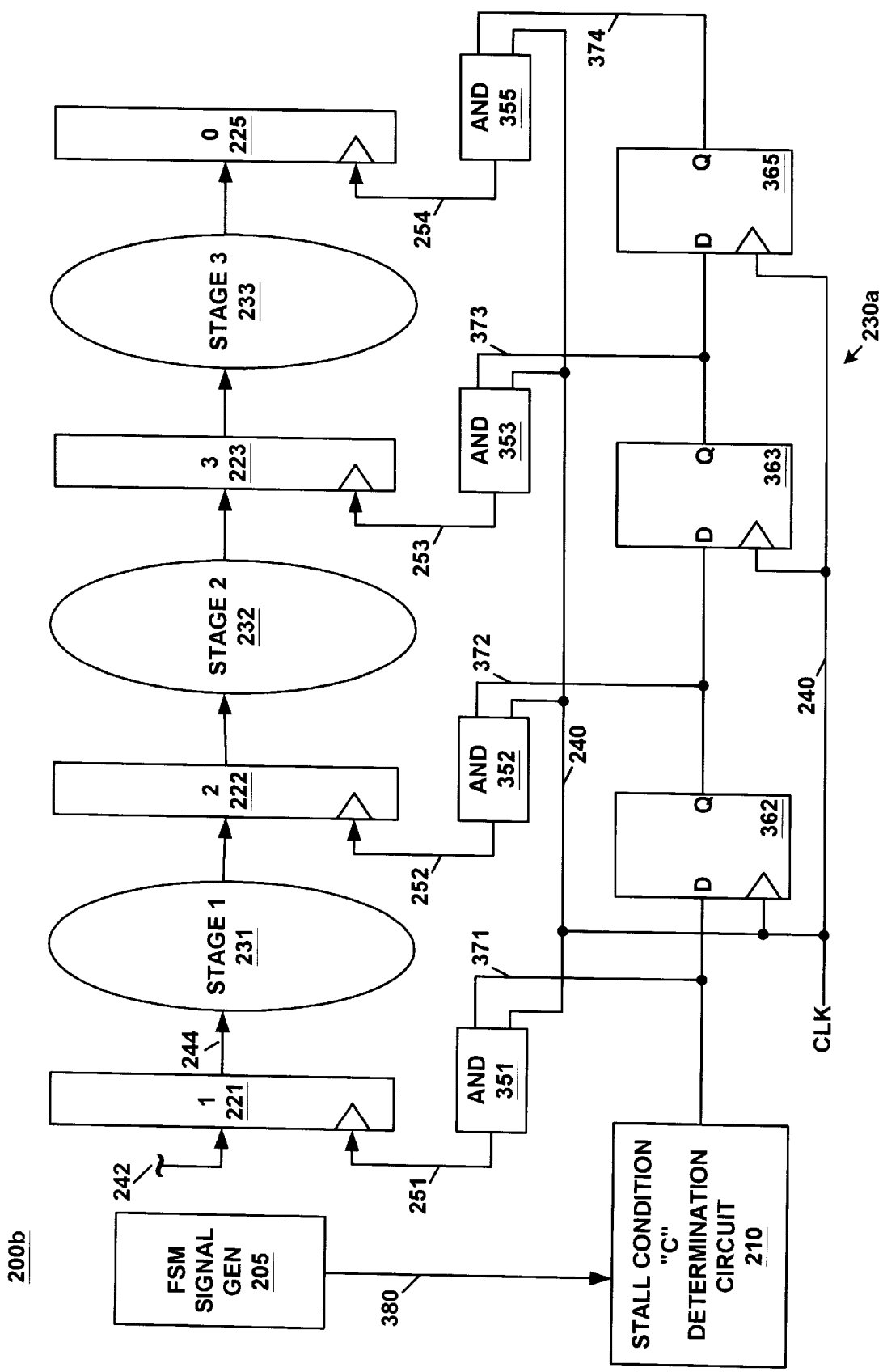
FIG. 6 is a circuit diagram illustrating one embodiment of the present invention employing serially coupled shift registers-for stage gating of a pipelined design where a finite state machine generates a comparison result control signal.

FIG. 6 illustrates an embodiment of the present invention 200b which utilizes the serially coupled sequential elements as the propagation circuit 230a, as shown in FIG. 5, but relies on a finite state machine (FSM) 205 to generate the stall signal "C" and supply this signal over bus 380 to circuit 210. In one implementation, the FSM 205 performs a comparison between the new operand signal of bus 242 and the prior operand signal. As in the case of FIG. 5, the C stall signal is asserted low. The FSM circuit 205 can use any of a number of well known processes to determine whether or not the stall signal, "C," should be generated. In a case where the FSM circuit 205 also generates the operand signals, this embodiment of the present invention causes the FSM circuit 205 to generate a comparison signal over a control bus 380. The comparison signal generated over control bus 380 indicates whether the new multi-bit operand is greater than, equal to, not equal to, or less than the prior operand. This information is then fed to the stall signal determination circuit 210 which is programmed to generate the stall signal, C, depending on a programmed function. In this case, buses 242 and 244 need not be coupled to circuit 210, however, the remainder of circuit 200b is analogous in function and structure to circuit 200a (FIG. 5).

Figure 7:
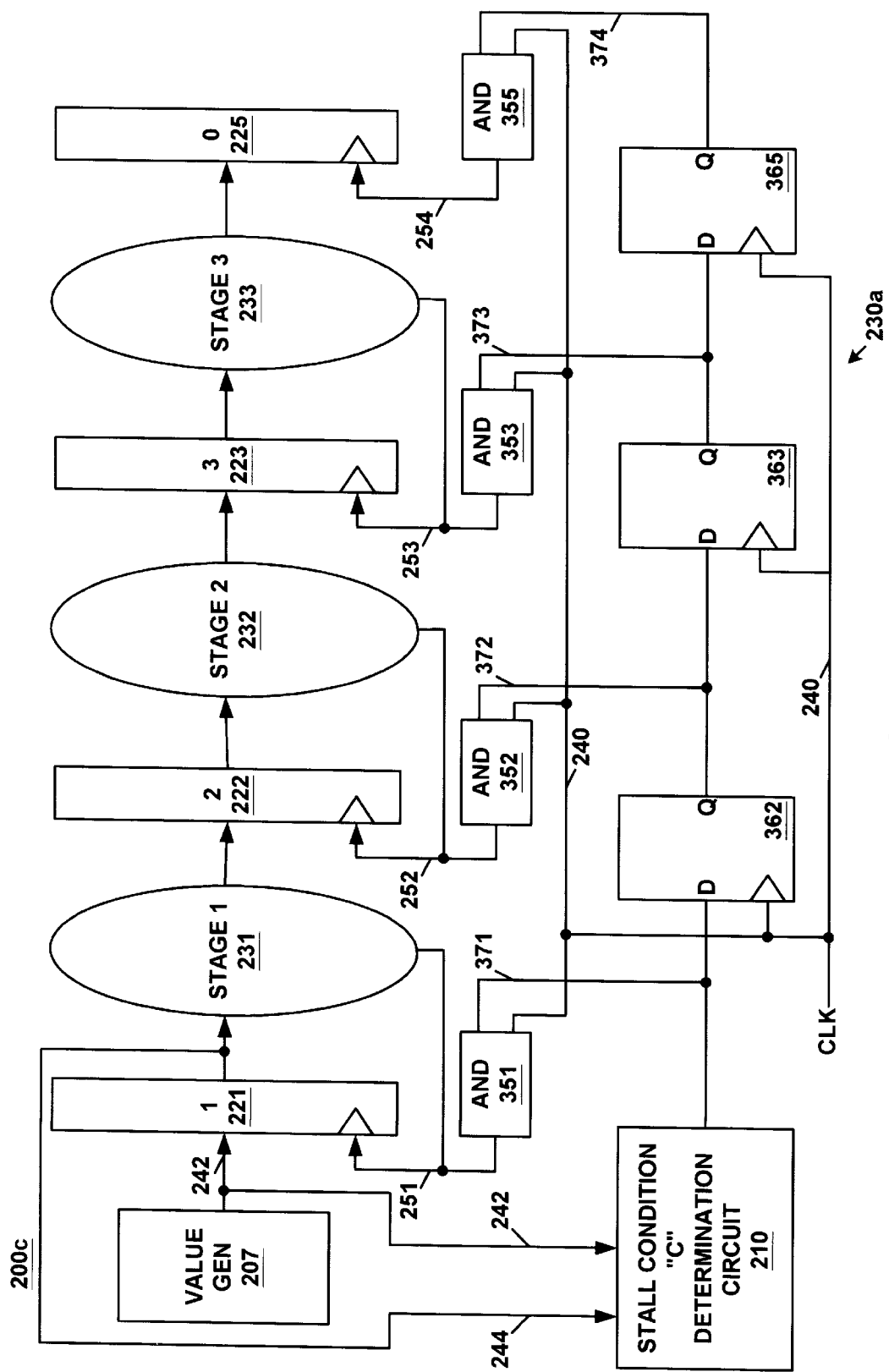
FIG. 7 is a circuit diagram of another embodiment of the present invention where both the combinational logic and the register of a pipelined circuit stage are clock gated for power savings.

FIG. 7 illustrates an embodiment of the present invention 200c which utilizes the serially coupled sequential elements as the propagation circuit 230a, as shown in FIG. 5, but clock gates the combinational logic circuits as well as the clocked registers of the pipeline circuit. The input operand is supplied over bus 242 from a value generation circuit 207. As in the case of FIG. 5, the C stall signal is asserted low. In some semiconductor technologies, the combinational logic is clocked. In these cases, power dissipation is reduced if the combinational logic gates are clock gated. For these technologies, circuit 200c can be employed to further reduce power dissipation. In circuit 200c, enable signal line 371 is fed to AND gate 351 the output of which is used to clock gate the combinational logic circuit 231 of the first pipe stage of the pipeline circuit as well as the register 221. Enable signal line 372 is fed to AND gate 352 and output of which is used to clock gate the combinational logic circuit 232 of the second pipe stage of the pipeline circuit as well as the register 222. Lastly, enable signal line 373 is fed to AND gate 353 the output of which is used to clock gate the combinational logic circuit 233 of the third pipe stage of the pipeline circuit as well as the register 223.

Figure 8:
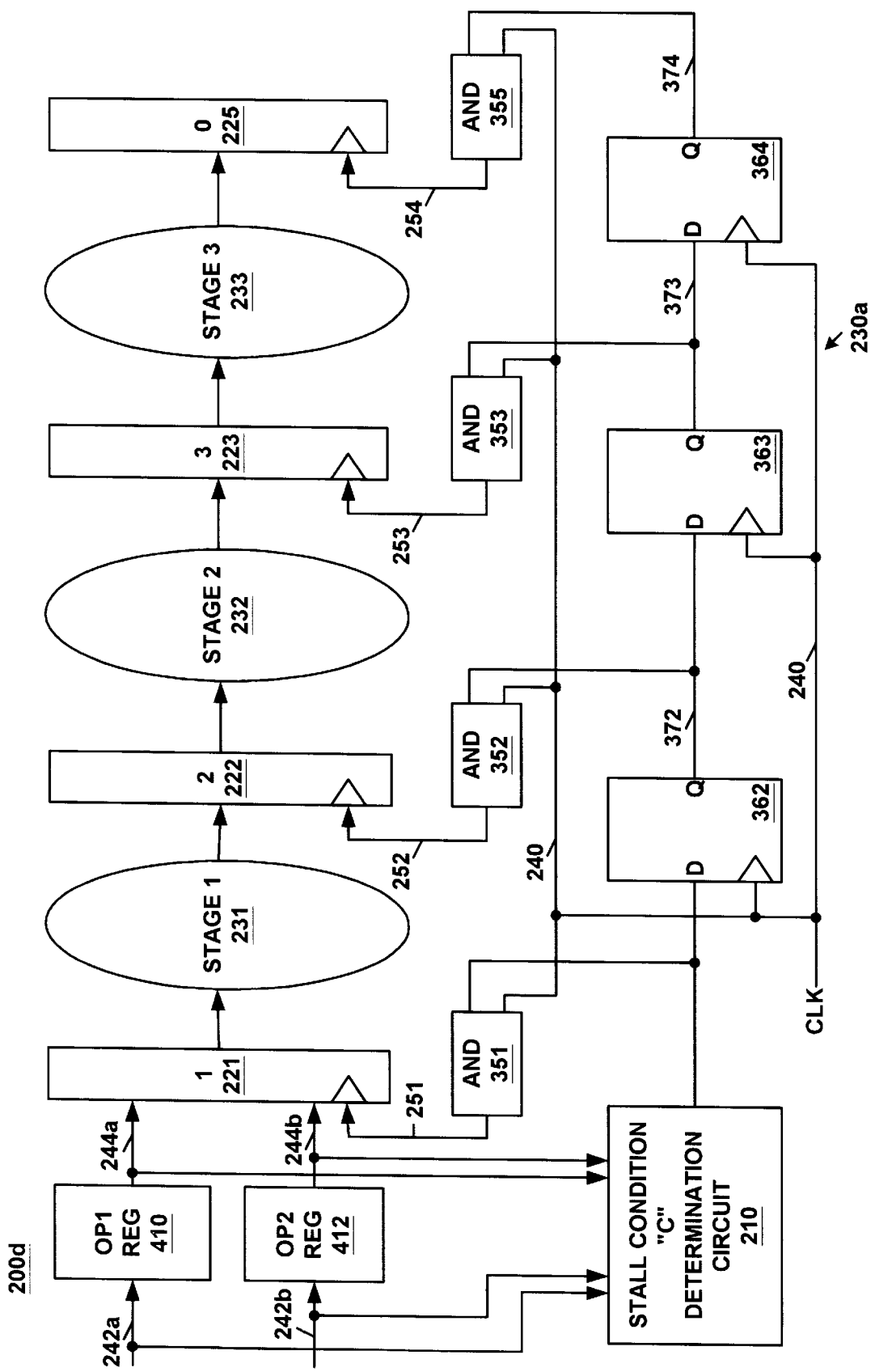
FIG. 8 is a circuit diagram of another embodiment of the present invention where the pipelined circuit accepts two input operands.

FIG. 8 illustrates an embodiment of the present invention 200d which utilizes the serially coupled sequential elements as the propagation circuit 230a, as shown in FIG. 5, but accepts two new operands each clock cycle. As in the case of FIG. 5, the C stall signal is asserted low. In this embodiment, a first new operand is received over bus 242a and a second new operand is received over bus 242b. These operands are each clocked, respectively, into clock registers 410 and 412. The output of register 410 holds the first prior operand over bus 244a and the output of register 412 holds the second prior operand over bus 244b. Each bus of 242a–242b and 244a–244b is coupled to the stall condition signal circuit 210. In this example, equality can be found if the first new operand is equal to the first prior operand and also the second new operand is equal to the second prior operand. Equality can also be found if the first new operand is equal to the second prior operand and also the second new operand is equal to the first prior operand. In one embodiment, maximum can be determined if the first and second new operands are greater than the first and second prior operands. Minimum can be determined if the first and second new operands are less than the first and second prior operands.

Figure 9:
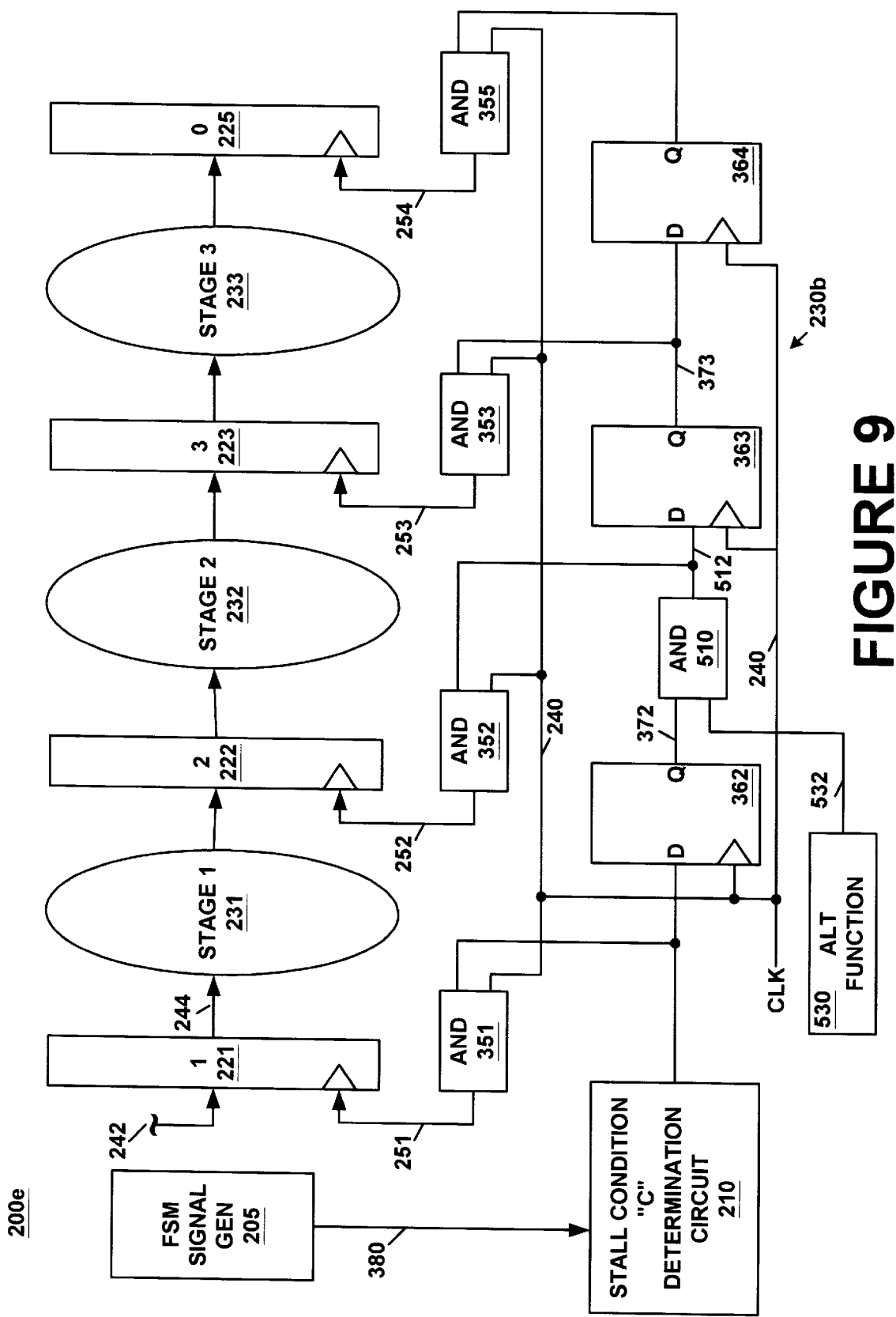
FIG. 9 is a circuit diagram of another embodiment of the present invention where the stall signal, C, can be introduced at an arbitrary stage, j, of an n stage pipelined circuit.

FIG. 9 illustrates an embodiment of the present invention 200e which utilizes the serially coupled sequential elements as the propagation circuit 230b, as shown in FIG. 5, but circuit 230b accepts an alternate stall function. New input operands are supplied over bus 242. The FSM circuit 205 generates the stall signal, C, over line 380. As in the case of FIG. 5, the C stall signal is asserted low. The stall condition computation of the present invention need not be computed at the start of the pipeline but can be computed at any pipe stage before the end of the pipeline circuit. In this embodiment 200e, a stall condition is computed by an alternate stall computation circuit 530 and this result is injected into the propagation circuit 230b at some stage, j, before the last stage, n, of the pipeline circuit.

More specifically, circuit 200e contains an alternate stall function generator 530 which generates the result of an alternate stall function over line 532. In this embodiment, the stall signals are asserted low therefore the AND gate performs the proper "OR" function to inject the alternative stall signal into the serial shift register. AND gate 510 inputs line 532 which is ANDed with the line 372 which generates a result over line 512. Line 512 is then the enable line for the second pipe stage of the pipeline circuit. In this fashion, the stall signal can originate at the second pipe stage (e.g., j=2) rather than the first pipe stage, as shown before. Using this technique of ANDing the stall signal of the serial shift register with an alternate function, the present invention can inject an external stall signal into any arbitrary pipe stage, j, of the n pipe stages of the pipeline circuit.

Figure 10:
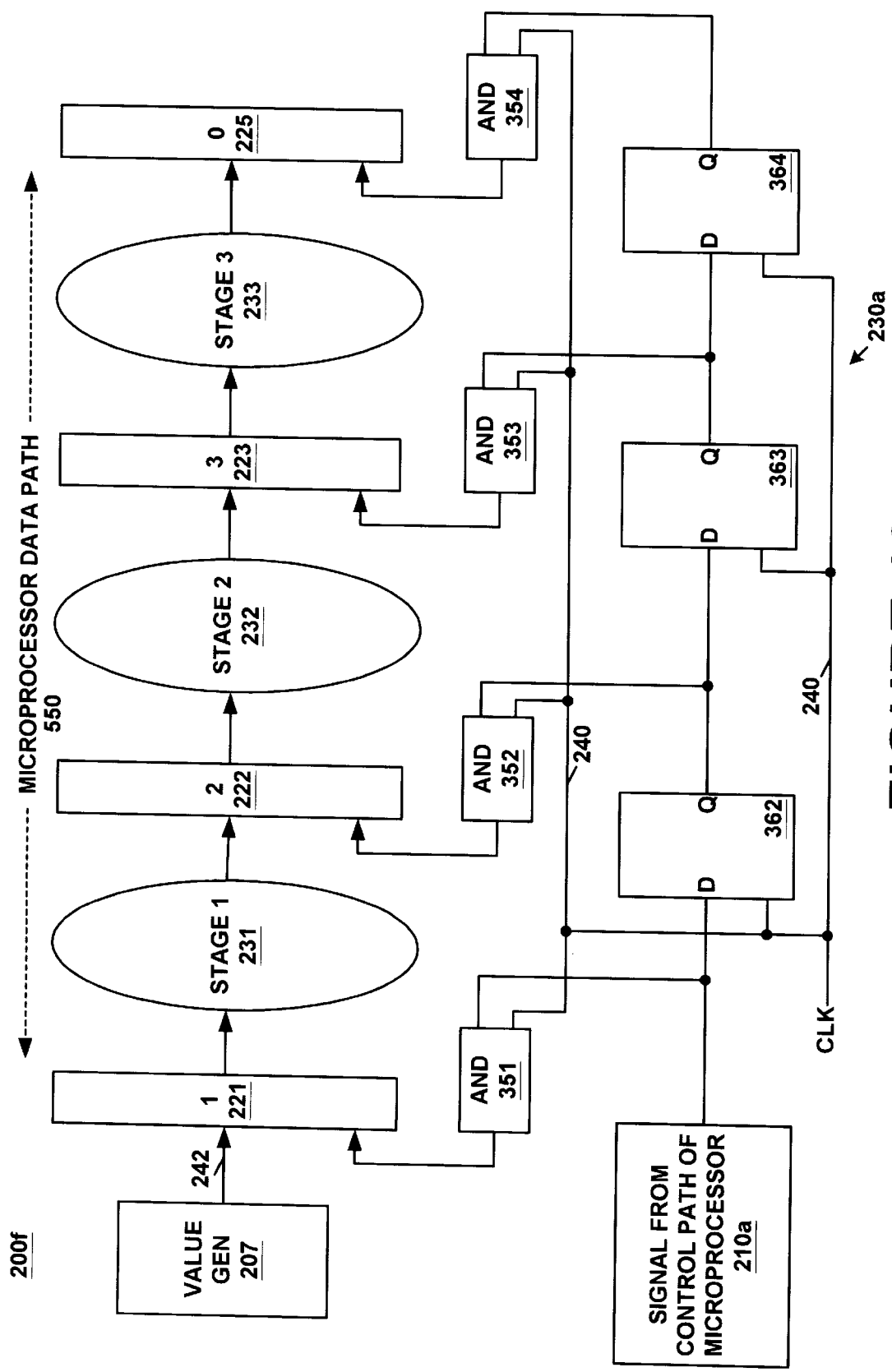
FIG. 10 is an implementation of the present invention where power savings is employed by stage gating the data path pipelined circuitry of a microprocessor while stall signals are generated by the control path of the microprocessor.

FIG. 10 illustrates a particular application 200f of the present invention within a processor architecture. New input operands are produced by a value generator 207 and supplied over bus 242. In this case, the pipeline circuit is found within the data path 550 of the microprocessor. In a general scenario, an external supervisor may produce the stall signal, C. Rather than shutting down the entire pipeline circuit, the supervisor uses information about the redundancy of the applied input operands to indicate that the result of a particular input operand is not relevant. This allows application of the present invention to pipelined processors. By viewing the control part of the processor pipeline as a separate design entity from the data portion, control signals produced by the former can be used as stall signals in the latter. More specifically, the stall signal generation circuitry 210a originates from the control path of the processor architecture. This embodiment recognizes that the data path circuitry of the microprocessor is the better selection for application of the power savings techniques of the present invention within a processor architecture.

CONCLUSION

The present invention provides power savings over a conventional pipeline in the following manner. For cases in which the incoming data is inconsequential, e.g., the data does not need to be processed, power is saved because: (1) the register is clock gated and does not transition; and (2) the same values are applied to the combinational logic block of the clock gated pipe stage thereby obviating any switching activity therein. However, with respect to duplicate data, power is saved only in clock gating the register because the duplicate data would not have caused the combinational logic to switch anyway. Early computer simulations and trials have shown at least a 16 percent power savings in exemplary pipelined designs.

The preferred embodiment of the present invention, a power savings method and circuit for pipeline stage gating of an operational pipelined circuit for operands having inconsequential results, is thus described. While the present invention has been described in particular embodiments, it should be appreciated that the present invention should not be construed as limited by such embodiments, but rather construed according to the below claims.

What is claimed is:

1. A method for reducing power within an electronic integrated circuit, said method comprising the steps of:

a) at a clock cycle, receiving an operand signal at a circuit stage of a pipelined circuit;

b) determining that the result of said operand signal is inconsequential to said pipelined circuit;

c) responsive to said step b), generating a stall signal associated with said operand signal that clock gates said circuit stage of said pipelined circuit during said clock cycle; and d) clock gating successive downstream circuit stages of said pipelined circuit for power savings by propagating said stall signal through a clocked register circuit in synchronization with subsequent clock cycles.

2. A method of reducing power as described in claim 1 wherein said step b) comprises the step of comparing said operand signal with a prior operand signal previously received by said pipelined circuit.

3. A method of reducing power as described in claim 2 wherein said step b) further comprises the step of determining that said result of said operand signal is inconsequential to said pipeline circuit by determining that said operand signal and said prior operand signal are equal.

4. A method of reducing power as described in claim 2 wherein said step b) further comprises the step of determining that said result of said operand signal is inconsequential to said pipeline circuit by determining that said operand signal is greater than said prior operand signal.

5. A method of reducing power as described in claim 2 wherein said step b) further comprises the step of determining that said result of said operand signal is inconsequential to said pipeline circuit by determining that said operand signal is less than said prior operand signal.

6. A method for reducing power as described in claim 1 wherein said step d) comprises the step of clocking said stall signal through respective circuit stages of a serially coupled shift register circuit and wherein each circuit stage of said shift register circuit is coupled to clock gate a respective circuit stage of said pipelined circuit.

7. A method for reducing power as described in claim 1 wherein each circuit stage of said pipelined circuit comprises a clocked register coupled to a combinational logic circuit.

8. A method for reducing power within an integrated circuit, said method comprising the steps of:

a) at a first clock cycle, receiving a first operand signal at a first circuit stage of a pipelined circuit;

b) at a next clock cycle, receiving a second operand signal at said first circuit stage and maintaining said first operand signal in a register circuit;

c) determining, based on said first and second operand signals, that the result of said second operand signal is inconsequential to said pipelined circuit;

d) responsive to said step c), generating a stall signal associated with said second operand signal that clock gates said first stage of said pipelined circuit during said first clock cycle; and e) clock gating successive downstream circuit stages of said pipelined circuit for power savings by propagating said stall signal through a clocked register circuit in synchronization with subsequent clock cycles.

9. A method of reducing power as described in claim 8 wherein said step c) comprises the step of comparing said second operand signal with said first operand signal.

10. A method of reducing power as described in claim 9 wherein said step c) further comprises the step of determining that said result of said second operand signal is inconsequential to said pipeline circuit by determining that said second operand signal and said first operand signal are equal.

11. A method of reducing power as described in claim 9 wherein said step b) further comprises the step of determining that said result of said second operand signal is inconsequential to said pipeline circuit by determining that said second operand signal is greater than said first operand signal.

12. A method of reducing power as described in claim 9 wherein said step b) further comprises the step of determining that said result of said second operand signal is inconsequential to said pipeline circuit by determining that said second operand signal is less than said first operand signal.

13. A method for reducing power as described in claim 8 wherein said step e) comprises the step of clocking said stall signal through respective circuit stages of a serially coupled shift register circuit and wherein each circuit stage of said shift register circuit is coupled to clock gate a respective circuit stage of said pipelined circuit.

14. A method for reducing power as described in claim 8 wherein each circuit stage of said pipelined circuit comprises a clocked register coupled to a combinational logic circuit.

15. A circuit comprising:
   a pipeline circuit having an input port and an output port, said pipeline-circuit comprising n serially coupled pipeline stages wherein each pipeline stage is clocked by a clock signal and comprises a clocked register coupled to a combinational logic circuit;
   stall determination logic coupled to said input port and coupled to an output of a clocked register of a first pipeline stage of said pipeline circuit, said stall determination logic for determining when results of a first operand signal received at said input port are inconsequential to said pipeline circuit and for generating a stall signal in response thereto; and
   a signal propagation circuit for propagating said stall signal to the second through nth pipeline stages of said pipeline circuit in synchronization with said clock signal wherein said stall signal is for clock gating respective pipeline stages of said pipeline circuit for power savings.

16. A circuit as described in claim 15 further comprising clock gating circuitry coupled to said signal propagation circuit and coupled to said pipeline circuit, said clock gating circuitry for clock gating a respective pipeline stage of said pipeline circuit based on said stall signal of said signal propagation circuit.

17. A circuit as described in claim 16 wherein said clock gating circuitry comprises a plurality of AND gates each coupled to said clock signal and each coupled to a respective clocked register of said pipeline circuit.

18. A circuit as described in claim 16 wherein said signal propagation circuit comprises a serial shift register having (n–1) stages wherein each stage is for clock gating a respective pipeline stage of said second through nth pipeline stages.

19. A circuit as described in claim 16 wherein said output of said clocked register of said first pipeline stage is for holding a second operand signal and wherein said stall determination logic is a comparator for generating said stall signal in response to said first operand signal being equal to said second operand signal.

20. A circuit as described in claim 16 wherein said output of said clocked register of said first pipeline stage is for holding a second operand signal and wherein said stall determination logic is a comparator for generating said stall signal in response to said first operand signal being smaller than said second operand signal.

21. A circuit as described in claim 16 wherein said output of said clocked register of said first pipeline stage is for holding a second operand signal and wherein said stall determination logic is a comparator for generating said stall signal in response to said first operand signal being larger than said second operand signal.

22. A circuit as described in claim 16 further comprising an alternate stall signal generator circuit for generating an alternate stall signal and wherein said signal propagation circuit is also for propagating said alternate stall signal through said pipeline stages of said pipeline circuit.

23. A data path circuit comprising:
   a pipeline circuit having an input port and an output port, said pipeline circuit comprising n serially coupled pipeline stages wherein each pipeline stage is clocked by a clock signal and comprises a clocked register coupled to a combinational logic circuit;
   a comparator circuit coupled to said input port and coupled to an output of a clocked register of a first pipeline stage of said pipeline circuit wherein said output of said clocked register holds a second operand signal, said comparator circuit for generating a stall signal for clock gating said first pipeline stage in response to said input port receiving a first operand signal that equals said second operand signal;
   a serial shift register having (n–1) stages clocked to said clock signal, said serial shift register coupled to receive said stall signal and for propagating said stall signal through said (n–1) stages in synchronization with said clock signal wherein each stage of said shift register is for clock gating a respective pipeline stage of the second through nth pipeline stages of said pipeline circuit; and
   a plurality of AND gates for clock gating a pipe stage of said pipeline circuit based on said stall signal wherein each AND gate is coupled to a respective stage of said serial shift register and is also coupled to a respective pipeline stage of said second through nth pipeline stages of said pipeline circuit.

24. A data path circuit as described in claim 23 further comprising a microprocessor having data path circuitry and control circuitry wherein said pipeline circuit is part of said data path circuitry of said microprocessor and wherein said comparator circuit is part of said control circuitry of said microprocessor.

25. In a computer system, a method for synthesizing a circuit in computer memory, said method comprising the steps of:
   a) synthesizing a pipeline circuit having an input port and an output port, said pipeline circuit comprising n serially coupled pipeline stages wherein each pipeline stage is clocked by a clock signal and comprises a clocked register coupled to a combinational logic circuit;
   b) synthesizing a stall determination logic which is coupled to said input port and coupled to an output of a clocked register of a first pipeline stage of said pipeline circuit, said stall determination logic for determining when results of a first operand signal received at said input port are inconsequential to said pipeline circuit and for generating a stall signal in response thereto; and
   c) synthesizing a signal propagation circuit for propagating said stall signal to the second through nth pipeline stages of said pipeline circuit in synchronization with said clock signal wherein said stall signal is for clock gating respective pipeline stages of said pipeline circuit for power savings.

26. A method as described in claim 25 further comprising the step of synthesizing clock gating circuitry which is coupled to said signal propagation circuit and coupled to said pipeline circuit, said clock gating circuitry for clock gating a respective pipeline stage of said pipeline circuit based on said stall signal of said signal propagation circuit.

27. A method as described in claim 26 wherein said step c) comprises the step of synthesizing a serial shift register having (n−1) stages, wherein said signal propagation circuit comprises said serial shift register having (n−1) stages and wherein each stage is for clock gating a respective pipeline stage of said second through nth pipeline stages.

28. A method as described in claim 26 wherein said output of said clocked register of said first pipeline stage is for holding a second operand signal and wherein said stall determination logic is a comparator for generating said stall signal in response to said first operand signal being equal to said second operand signal.

* * * * *